(12) United States Patent
Planeta et al.

(10) Patent No.: US 7,220,113 B2
(45) Date of Patent: May 22, 2007

(54) GAUGE DISTRIBUTION APPARATUS FOR PLASTIC FILM

(75) Inventors: Mirek Planeta, Mississauga (CA); Joe Suhay, Mississauga (CA)

(73) Assignee: Macro Engineering & Technology Inc., Mississauga, Ontario (CA)

( * ) Notice: Subject to any disclaimer, the term of this patent is extended or adjusted under 35 U.S.C. 154(b) by 0 days.

(21) Appl. No.: 11/102,682

(22) Filed: Apr. 11, 2005

(65) Prior Publication Data

US 2006/0228437 A1 Oct. 12, 2006

(51) Int. Cl.
*B29C 47/90* (2006.01)
*B29C 53/10* (2006.01)

(52) U.S. Cl. ............... 425/315; 425/72.1; 425/326.1; 425/327

(58) Field of Classification Search ........... 425/72.1, 425/308, 315, 325, 326.1, 327, 377
See application file for complete search history.

(56) References Cited

U.S. PATENT DOCUMENTS

| | | | | |
|---|---|---|---|---|
| 3,492,693 A | * | 2/1970 | Clarke et al. ............... | 425/308 |
| 3,576,935 A | * | 4/1971 | Dyer et al. ................. | 425/327 |
| 3,632,265 A | * | 1/1972 | Upmeier .................. | 425/326.1 |
| 3,657,974 A | * | 4/1972 | Hedrich et al. ............. | 425/327 |
| 4,676,728 A | * | 6/1987 | Planeta ...................... | 425/72.1 |
| 4,760,627 A | * | 8/1988 | Schele ........................ | 425/327 |
| 5,727,723 A | * | 3/1998 | Cree .......................... | 425/326.1 |
| 6,013,212 A | * | 1/2000 | Planeta et al. ............. | 264/40.7 |

\* cited by examiner

*Primary Examiner*—Robert Davis
*Assistant Examiner*—Joseph Leyson
(74) *Attorney, Agent, or Firm*—Robert F. Delbridge

(57) ABSTRACT

Gauge distribution apparatus for plastic film has a frame, a rotor mounted on the frame for sequential reversed rotation about a substantially vertical axis, and at least one slot in the rotor through which two lengths of plastic film can pass upwardly with spaced adjacent faces from below the rotor. First and second turning members are mounted on the rotor for receiving a respective length of plastic film and changing the direction of motion thereof from upwardly to horizontally. A series of upstanding circumferentially spaced film engaging members extend around the rotor, each film engaging member having an outer surface for engagement by the plastic film. Third and fourth turning members are mounted on the frame for receiving a respective length of plastic film after it has engaged at least one of the film engaging members and changing its direction of motion from horizontally to vertically.

2 Claims, 5 Drawing Sheets

US 7,220,113 B2

GAUGE DISTRIBUTION APPARATUS FOR PLASTIC FILM

FIELD OF INVENTION

This invention relates to gauge distribution apparatus for plastic film.

BACKGROUND OF INVENTION

It is well known to provide apparatus for gauge distribution in tubular plastic film, see for example U.S. Pat. No. 4,676,728 (Planeta) issued Jun. 10, 1987, the contents of which are hereby incorporated herein by reference. In this prior patent, the tubular plastic film is extruded from an annular extrusion die to form an air film bubble which is subsequently collapsed to a flat condition before being passed through gauge distribution apparatus which laterally distributes any unevenness in the gauge (thickness) of the film before it is wound to form a roll.

There is currently a need for plastic film which is tacky on at least one side, for use for example as temporary protection for the surface of articles to which the tacky film will removably adhere. Gauge distribution apparatus such as described in the above-mentioned patent is not suitable for such film because collapsing extruded tubular plastic film which is tacky on at least one side to a flat condition is usually not an option.

It is therefore an object of the present invention to provide gauge distribution apparatus which overcomes the problem mentioned above.

SUMMARY OF INVENTION

According to the present invention, gauge distribution apparatus for plastic film has a frame a rotor mounted on the frame for sequential reversed about a substantially vertical axis at least one slot in the rotor through which two lengths of plastic film can pass upwardly with spaced adjacent faces from below the rotor, a first turning member mounted on the rotor for receiving one length of plastic film and changing the direction of motion thereof from upwardly to horizontally, a second turning member mounted on the rotor for receiving the other length of plastic film and changing its direction of motion from upwardly to horizontally, a series of upstanding circumferentially spaced film engaging members extending around the rotor, each film engaging member having an outer surface for engagement by the plastic film, a third turning member mounted on the frame for receiving one length of plastic film after it has engaged at least one of the film engaging members and changing its direction of motion from horizontally to vertically, and a fourth turning member mounted on the frame for receiving the other length of plastic film after it has engaged at least one of the film engaging members, one length of the plastic film first engaging a film engaging member which is diametrically opposite a film engaging member first engaged by the other length of plastic film, and said lengths of plastic film travelling in opposite directions around respective portions of the rotor.

The gauge distribution apparatus may also have a collapsing frame carried by the rotor for collapsing upwardly moving tubular plastic film and slitters for slitting the film at diametrical opposite positions to create said two layers of plastic film which pass upwardly through said at least one slot.

Thus, because the adjacent faces of the two lengths of plastic film do not come into contact with each other, no problem arises if their faces are tacky.

It will be understood that although gauge distribution apparatus in accordance with the present invention is especially useful with tacky plastic film, it may also be used with non-tacky plastic film.

DESCRIPTION OF PREFERRED EMBODIMENT

Figure 1:
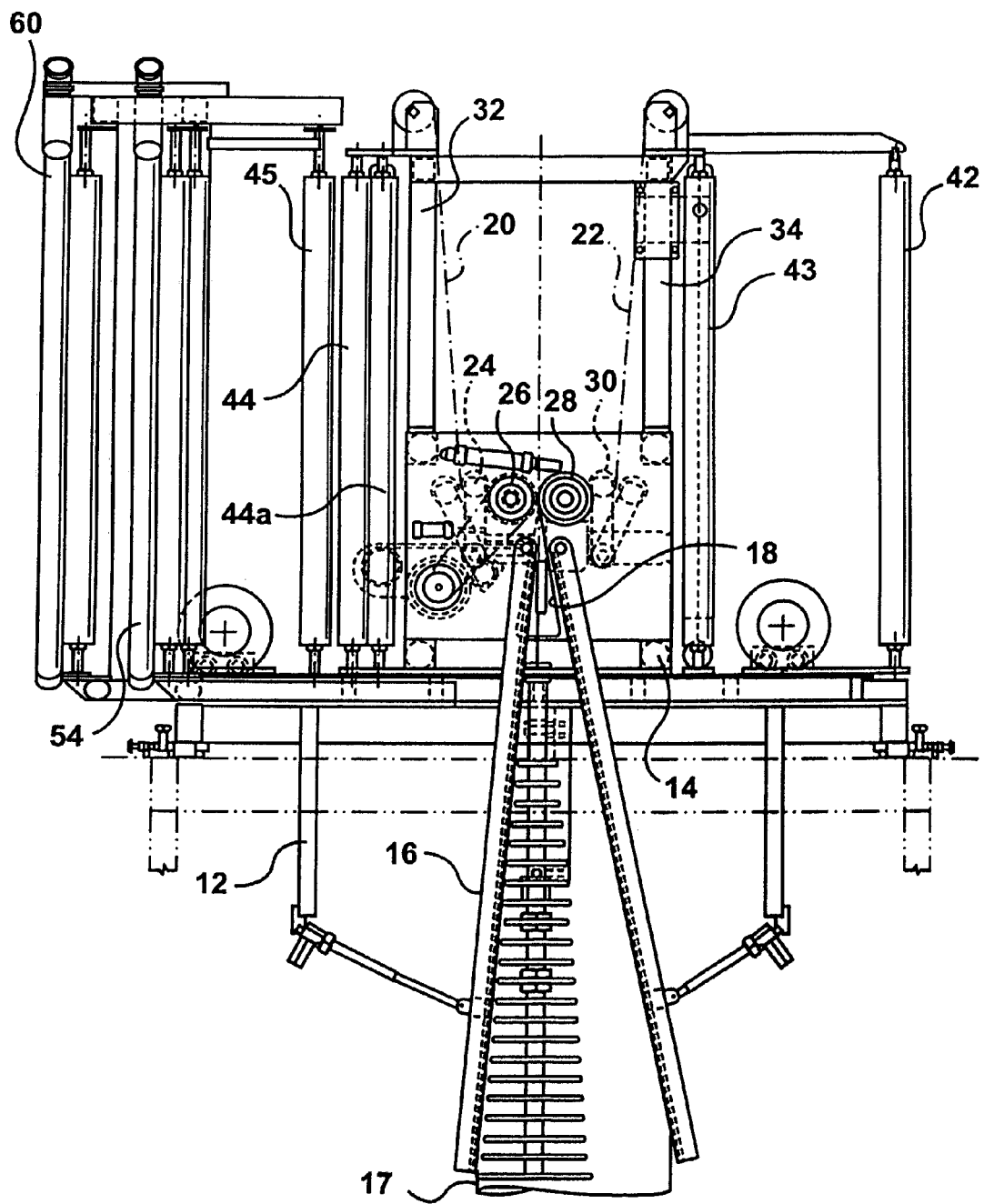
FIG. 1 is a somewhat diagrammatic side view of gauge distribution apparatus in accordance with one embodiment of the invention.

Referring to the drawings, gauge distribution apparatus has a frame 12 (only part of which is shown) on which a rotor is mounted for oscillating rotation about a vertical axis through 360 degrees by a motor (not shown) in known manner. The rotor 14 carries a collapsing frame 16 for collapsing tubular plastic film 17 as it travels upwardly as a bubble from an annular extrusion die (not shown). The upper end of the collapsing frame 16 carries a pair of diametrically opposite slitters 18 for slitting the tubular film into two separate sheets 20, 22.

The rotor 14 also carries two pairs of horizontal feed rollers 24, 26 and 28, 30. One sheet 20 passes from the collapsing frame 16 around feed rollers 24, 26 and then to a turning bar 32 mounted on the rotor 14 which converts movement of the sheet 20 from vertical to horizontal. Likewise, the other film sheet 22 passes from the collapsing frame 16 around feed rollers 28, 30 and then to a turning bar 34 mounted on the rotor 14 which converts movement of the sheet 22 from vertical to horizontal.

Figure 2:
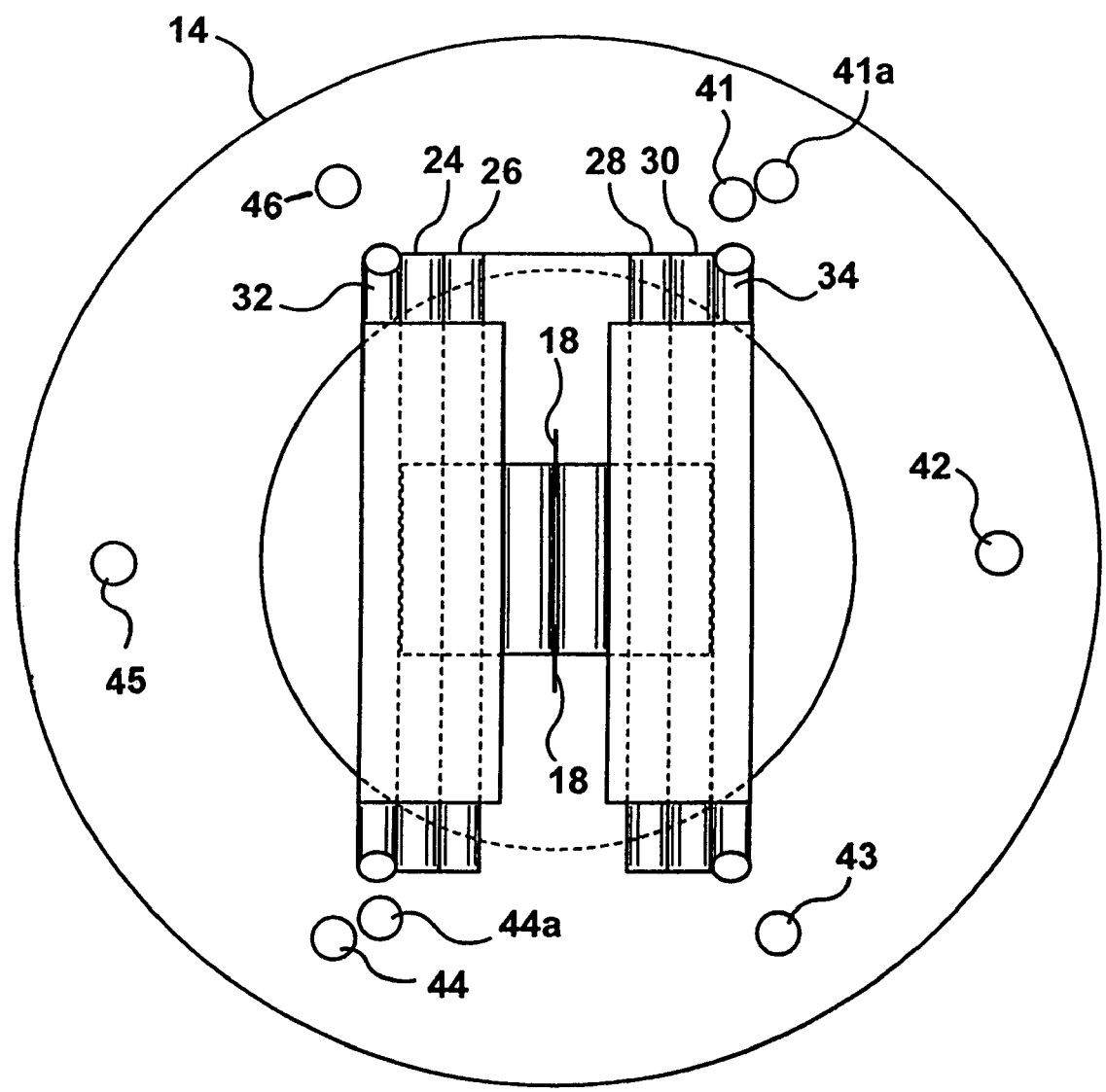
FIG. 2 is a diagrammatic plan view of the gauge distribution apparatus.

The feed rollers 26, 28 substantially close the top of the bubble formed by the tubular plastic film 18 to minimize loss of air therefrom. However, because the inside surface of the tubular plastic film 18 may be tacky, a small gap (for example about 1/16 inches) is provided between the feed rollers 26, 28 so that the separate film sheets 20, 22 do not touch each other. Subsequent loss of air from the bubble through the gap between the feed rollers 26, 28 can be replaced by internal bubble cooling equipment or other means as will be readily apparent to a person skilled in the art. For clarity, the gap has been greatly exaggerated in FIG. 2.

The rotor 14 carries six vertical guide rollers 41 to 46 equiangularly spaced around the circumference thereof, i.e. at 60 degree intervals. For reasons which will become more apparent later, roller 41 is twinned with a second roller 41a and the diagonally opposite roller 44 is twinned with a roller 44a. From the turning bar 32, film sheet 20 passes around roller 41 (or roller 41a) and film sheet film 22 passes around roller 44 (or 44(a)). Depending upon the angular position of the rotor 14, as will be described in more detail later, the film sheet 20 may also pass around one or more of the other guide rollers carried by the rotor 14 before passing around vertical guide rollers 50, 52 mounted on the frame 12. After passing around rollers 50, 52, film sheet 20 passes around a turning bar 54 secured to the frame 12 which converts horizontal movement of the film sheet 20 into downward vertical movement, after which the film sheet 20 is wound onto a roll (not shown) in known manner. Similarly, film sheet 22 may also pass around one or more of the other guide rollers carried by the rotor 14 before passing around vertical guide rollers 56, 58 mounted on the frame 12. After passing around rollers 56, 58, film sheet 22 passes around a turning bar 60 secured at the frame 12 which converts horizontal movement of the film sheet 22 into downward vertical movement, after which the film sheet 22 is wound onto another roll (not shown) in known manner.

Figure 3:
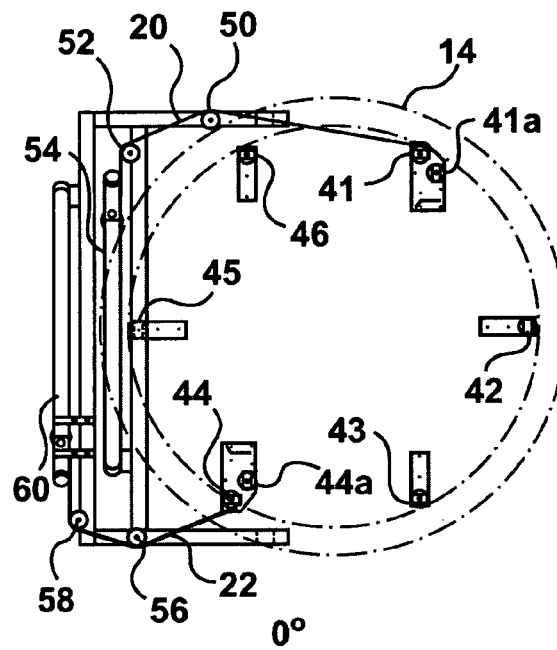
FIGS. 3 to 12 are diagrammatic plan views similar to FIG. 2 showing the paths followed by the two sheets of plastic film as the rotor rotates.
Figure 4:
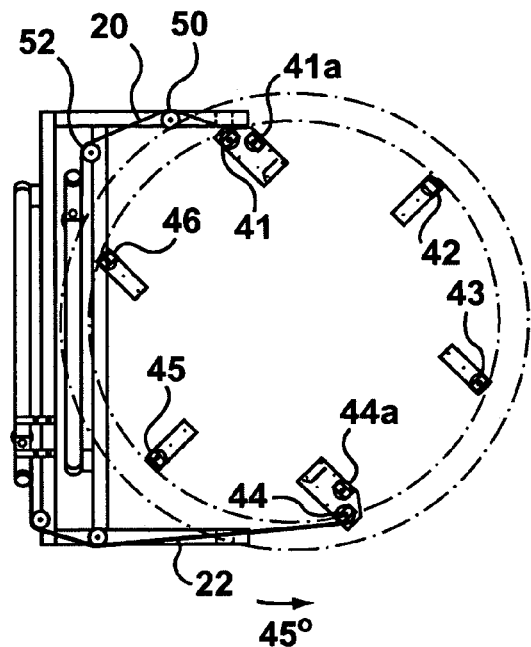
Figure 5:
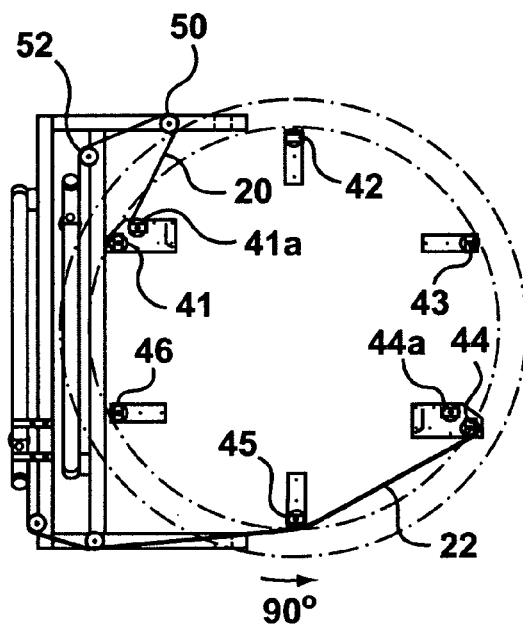
Figure 6:
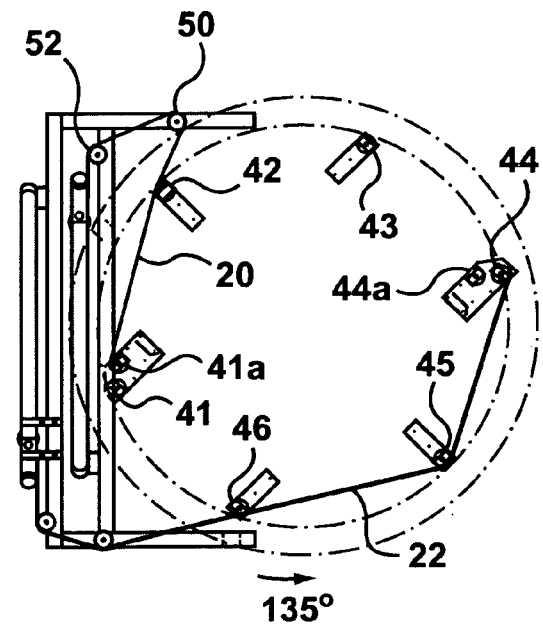
Figure 7:
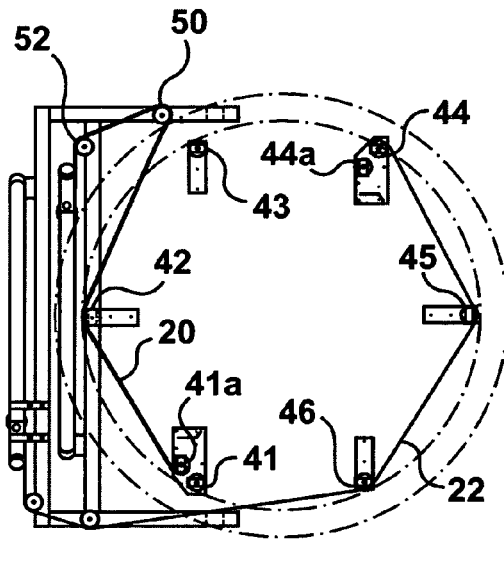
Figure 8:
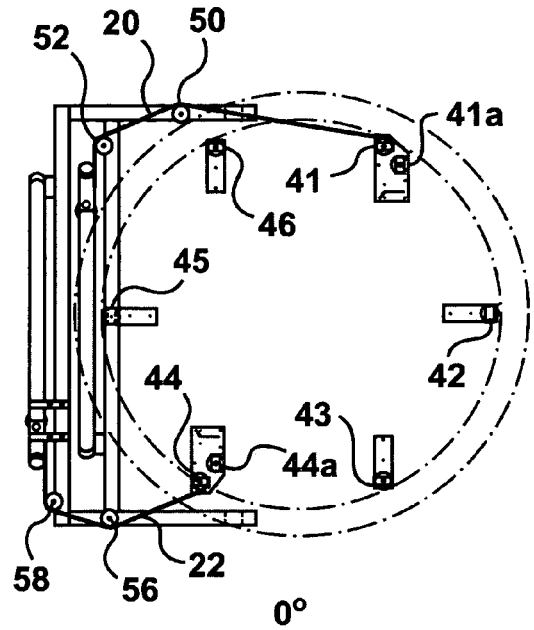
Figure 9:
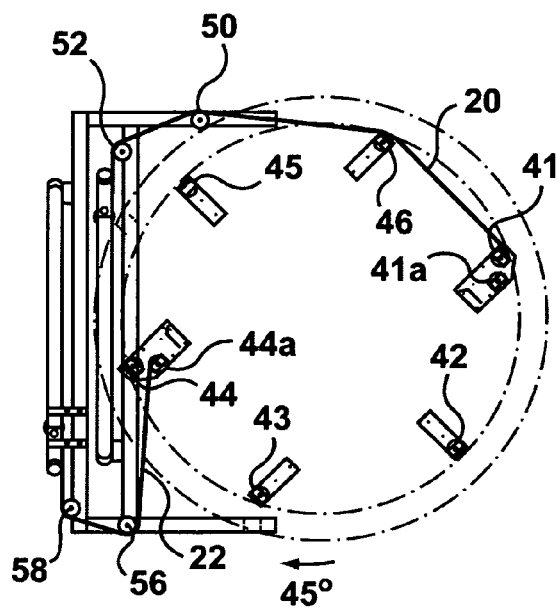
Figure 10:
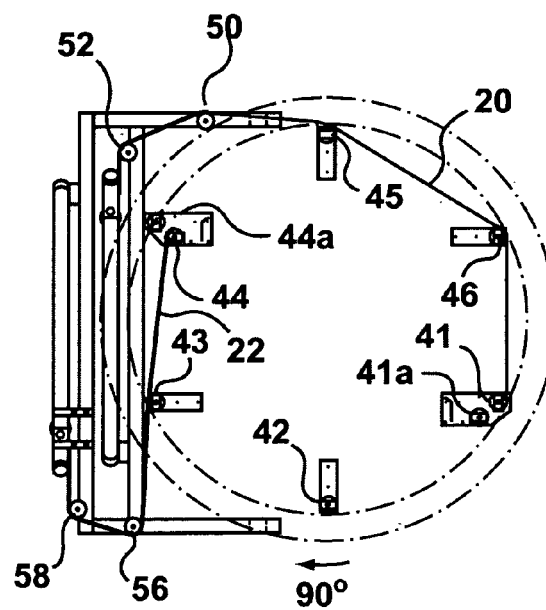
Figure 11:
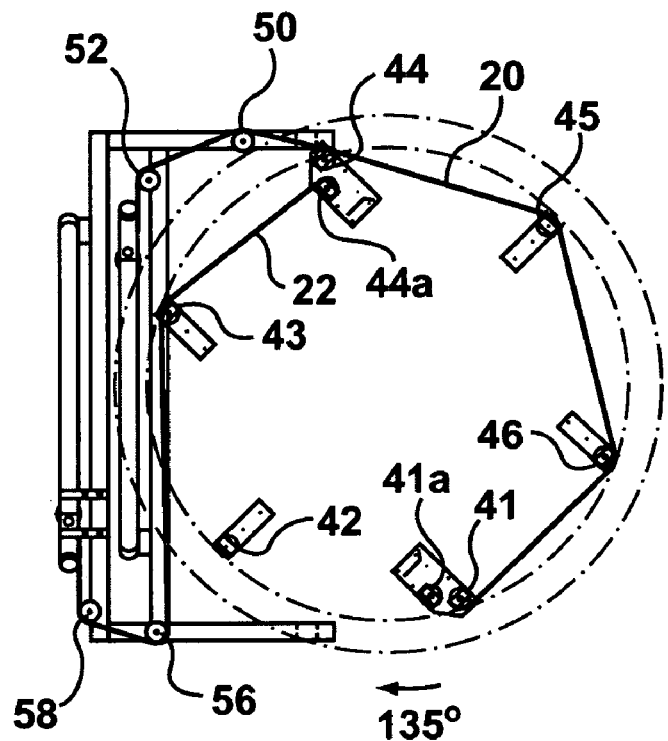
Figure 12:
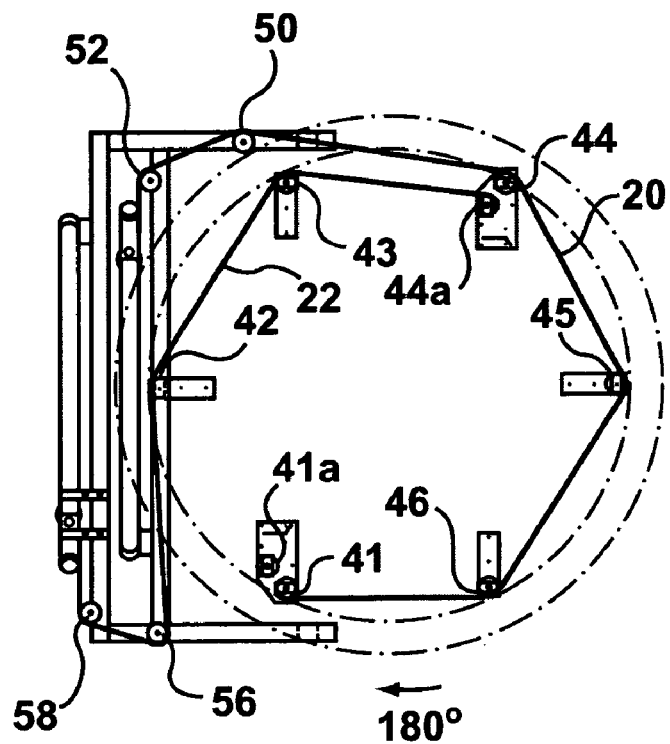

In use, and as shown particularly in FIGS. 3 to 12 (in which, for simplicity, some of the parts shown in FIG. 2 have been omitted), the rotor 14 is oscillated continuously through 360 degrees to cause any unevenness in the gauge of the film to be distributed around the tubular film or, in other words, across the width of the sheets 20, 22. FIG. 3 shows the rotor 14 in a mid-position which has been indicated as 0 degrees. FIGS. 4 to 7 shown successive positions at 45 degree intervals in an anticlockwise direction, with FIG. 7 showing the 180 degree position. The direction of rotation of rotor 14 is then reversed so that the rotation is clockwise until the position shown in FIG. 3 (and FIG. 8) is reached. Rotation through a further 180 degrees in a clockwise direction then occurs, as shown in FIGS. 8 to 12. When the position shown in FIG. 12 is reached, the direction of rotation of rotor 14 is reversed again so that rotation in an anticlockwise direction occurs until the position shown in FIG. 8 is reached, at which time the process is repeated.

FIGS. 3 to 12 also illustrate the variations in the paths of the two film sheets 20, 22 as the rotor 16 rotates. Depending upon the angular position of the rotor 14, the film sheet 20 sometime passes around guide roller 41 and sometimes passes around guide roller 41a, as well as passing around other guider rollers. Likewise, the film sheet 22 sometimes passes around guide roller 44 and sometimes around guide roller 44a as well as around other guide rollers. Also, in the positions shown in FIGS. 11 and 12, the film sheet 20 passes around guide roller 44 and the film sheet 22 passes around guide roller 44a.

The advantages of the invention, especially where an inwardly tacky tubular plastic film is being handled, will now be readily appreciated by a person skilled in the art. Other embodiments of the invention will also now be readily apparent to a person skilled in the art, the scope of the invention being defined in the appended claims.

The invention claimed is:

1. Gauge distribution apparatus for plastic film having:

a frame, a rotor mounted on the frame for sequential reversed rotation about a substantially vertical axis, at least one slot in the rotor through which two lengths of plastic film can pass upwardly with spaced adjacent faces from below the rotor, a first turning member mounted on the rotor for receiving one length of plastic film and changing the direction of motion thereof from upwardly to horizontally, a second turning member mounted on the rotor for receiving the other length of plastic film and changing its direction of motion from upwardly to horizontally, a series of upstanding circumferentially spaced film engaging members extending around the rotor, each film engaging member having an outer surface for engagement by the plastic film, a third turning member mounted on the frame for receiving one length of plastic film after it has engaged at least one of the film engaging members and changing its direction of motion from horizontally to vertically, and a fourth turning member mounted on the frame for receiving the other length of plastic film after it has engaged at least one of the film engaging members and changing its direction of motion from horizontally to vertically, one length of the plastic film first engaging a film engaging member which is diametrically opposite a film engaging member first engaged by the other length of plastic film, and said lengths of plastic film traveling in opposite directions around respective portions of the rotor.

2. Gauge distribution apparatus according to claim 1 also having a collapsing frame carried by the rotor for collapsing upwardly moving tubular plastic film and slitters for slitting the film at diametrical opposite positions to create said two lengths of plastic film which pass upwardly through said at least one slot.

* * * * *